(12) United States Patent
Hux

(10) Patent No.: US 6,864,887 B2
(45) Date of Patent: Mar. 8, 2005

(54) CLASSIFYING A VOXEL

(75) Inventor: W. Allen Hux, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 313 days.

(21) Appl. No.: 10/102,527

(22) Filed: Mar. 19, 2002

(65) Prior Publication Data

US 2003/0179196 A1 Sep. 25, 2003

(51) Int. Cl.$^7$ ............................................. G06T 17/00
(52) U.S. Cl. ...................................................... 345/424
(58) Field of Search ......................................... 345/424

(56) References Cited

U.S. PATENT DOCUMENTS 6,556,199 B1 * 4/2003 Fang et al. .................. 345/424

OTHER PUBLICATIONS

"Marching Cubes: A High Resolution 3D Surface Construction Algorithm"; William E. Lorenson, Harvey E. Cline; Computer Graphics; Siggraph '87 Conference Proceedings; Jul. 27–31, 1987; vol. 21, No. 4; Jul. 1987; ACM Siggraph; pp. 163–169.

"Rapid Octree Construction from Image Sequences"; Richard Szeliski; Image Understanding; ISSN 1049–9660; vol. 58, No. 1, Jul. 1993; Academic Press, Inc.; pp. 23–32..

"Surface reconstruction from Unorganized Points"; Hugues Hoppe et al.; Computer Graphics Proceedings; Siggraph '92; vol. 26, No. 2, Jul. 1992; pp. 71–78.

Automatic Reconstruction of 3 D Objects Using a mobile Monoscopic Camera; W. Niem, et al.; Proceedings International Conference on Recent Advances in 3D Digital Imaging and Modeling; May 12–15, 1997; National Research Council Canada; pp. 173–180.

* cited by examiner

Primary Examiner—Mark Zimmerman
Assistant Examiner—Lance W. Sealey
(74) Attorney, Agent, or Firm—Fish & Richardson P.C.

(57) ABSTRACT

A method of classifying a voxel having vertices includes projecting the vertices of the voxel onto an image. The image includes a set of pixels. The method also includes generating a bounding rectangle containing the vertices. The method further includes selecting pixels within the bounding rectangle and identifying the voxel based on the pixels selected.

30 Claims, 5 Drawing Sheets

CLASSIFYING A VOXEL

TECHNICAL FIELD

This disclosure relates to three-dimensional (3D) graphics and in particular to classifying voxels.

BACKGROUND

A two-dimensional area (2D) can be divided into square units called pixels. Likewise, a 3D volume can be divided into cubical units called voxels. Typically, each voxel is cubically shaped. In much the same way that a camera can be used to create a 2D pixel representation of a real-world object by taking a picture, a 3D voxel representation of a real-world object can be constructed by taking many pictures from different angles. Other techniques include using laser range-finding techniques. These techniques may result in a voxel space.

DESCRIPTION

Figure 1:
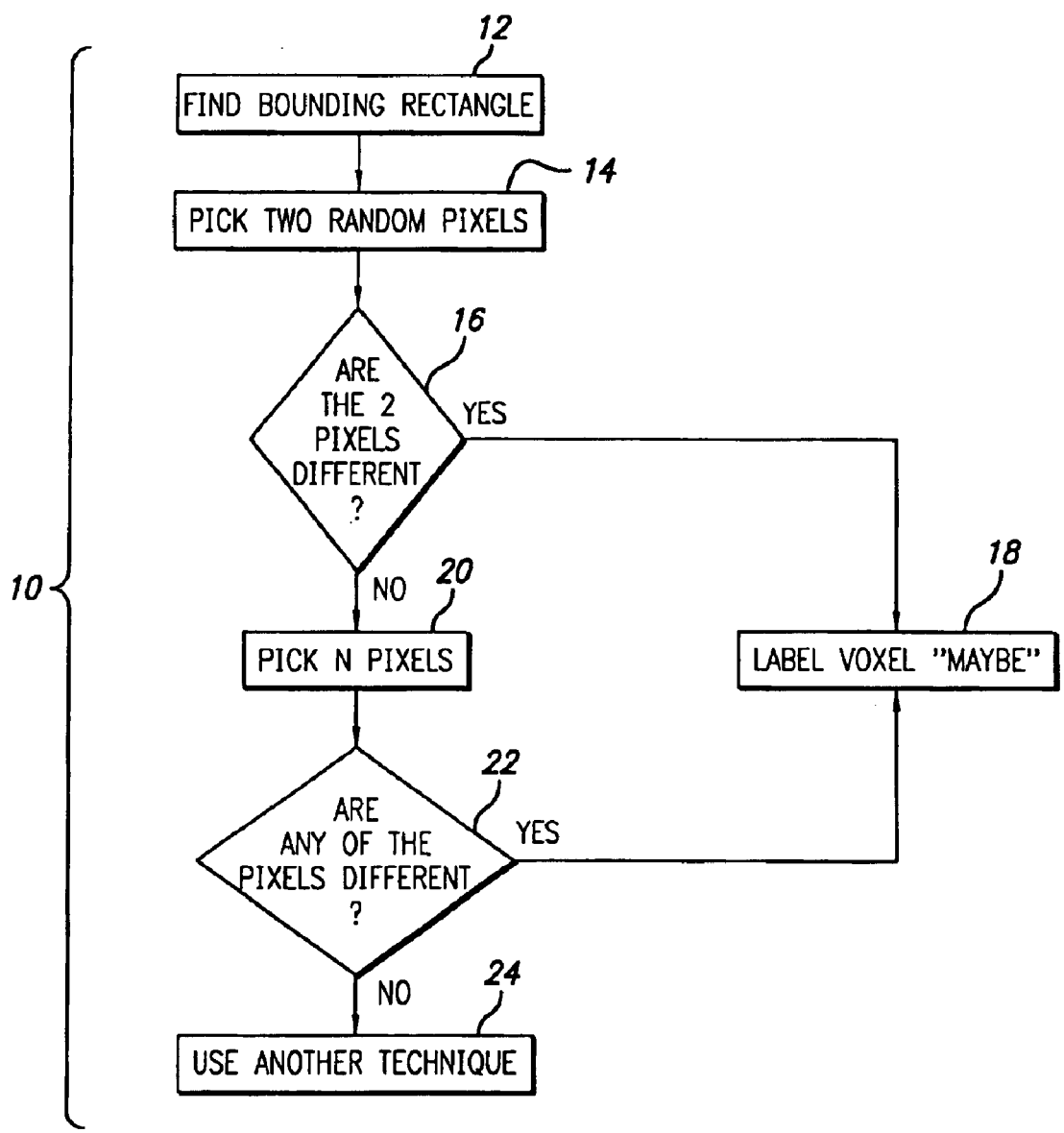
FIG. 1 is a flowchart of a process for classifying voxels.

Referring to FIG. 1, process 10 classifies voxels to generate a three-dimensional (3D) voxel representation of a real-world object. One way to generate the voxel representation is to have the voxel representation occupy the entire voxel space much like a sculptor begins with a block of granite. A two-dimensional (2D) image is taken of the real-world object. The voxels are projected onto the 2D image of the real-world object and a comparison is done to determine if the voxels are entirely within the real-world object, entirely outside the real-world object or neither. These voxels are labeled as either an "inside" voxel, an "outside" voxel or a "maybe" voxel. The "inside" voxel is entirely inside a surface of the real-world object. The "outside" voxel is entirely outside the surface of the real-world object. The "maybe" voxel has not been determined to be an "inside" voxel or an "outside" voxel.

Once the voxels have been labeled, another image is taken at a different angle and the voxels are compared to the real-world object and labeled again. The process is repeated until the voxel representation is complete. As the images are taken at different angles, the comparisons made, and the voxels classified, the block of voxels are "carved" into the voxel representation of the real-world object much like a sculptor carving an object. The voxel representation resembles blocks of cubes in the form of the real-world object.

Figure 2:
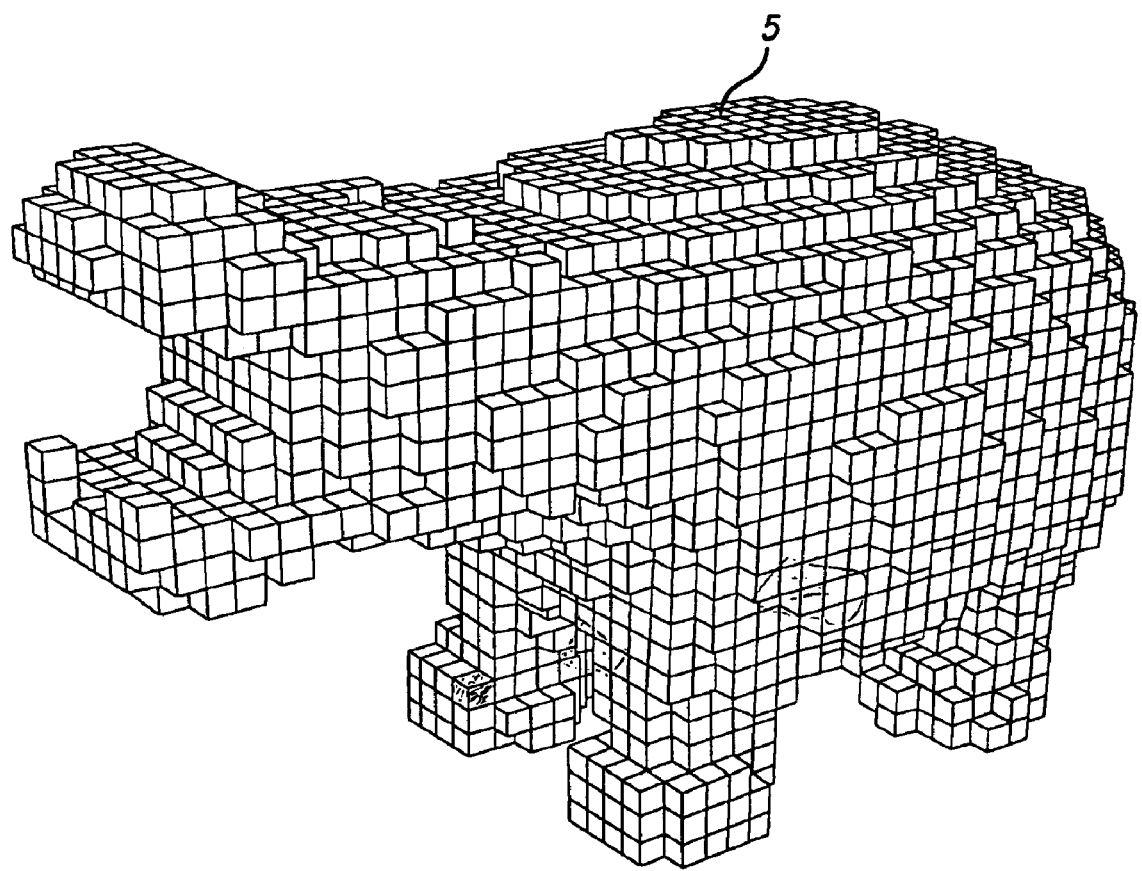
FIG. 2 is a voxel representation of a hippopotamus.
Figure 3:
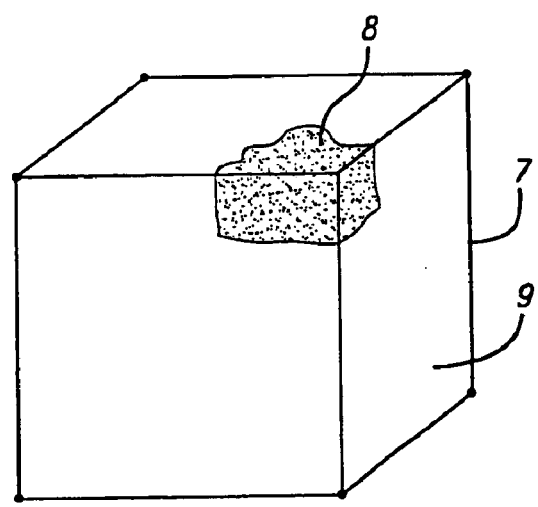
FIG. 3 is a "maybe" voxel.

Referring to FIGS. 2 and 3, for example, the real-world object may be a hippopotamus (not shown). Process 10 may generate a 3D voxel representation 5 (FIG. 2) corresponding to the real-world object in which the voxels inside the hippopotamus are visible and the voxels outside the hippopotamus are not visible. Process 10 uses a Monte-Carlo technique to determine if a voxel is entirely inside a surface of the real-world object (an "inside" voxel), entirely outside the surface (an "outside" voxel) or neither (a "maybe" voxel 7). The "maybe" voxel 7 has both regions 8 inside the real object and regions 9 outside the real world object (FIG. 3).

Figure 4A:
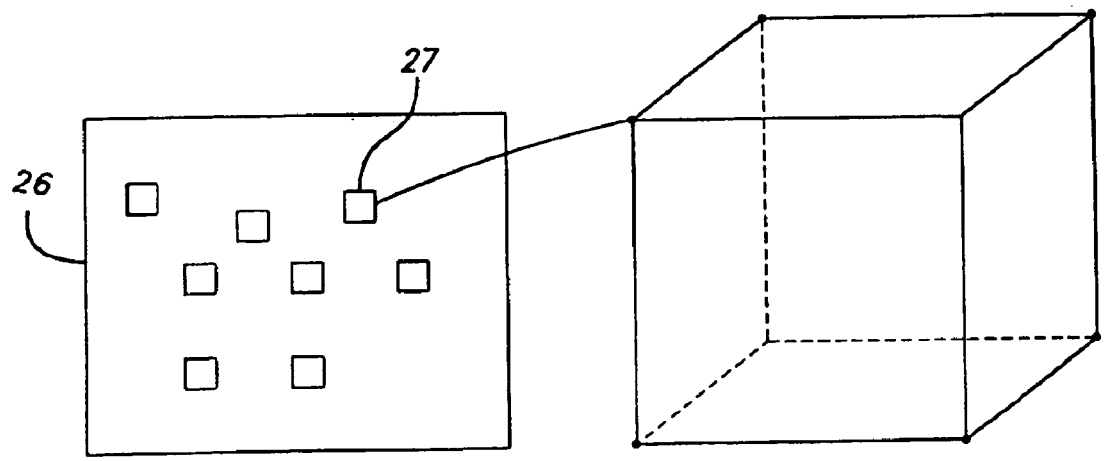
FIG. 4A is an example of the voxel vertices being projected onto an image.
Figure 4B:
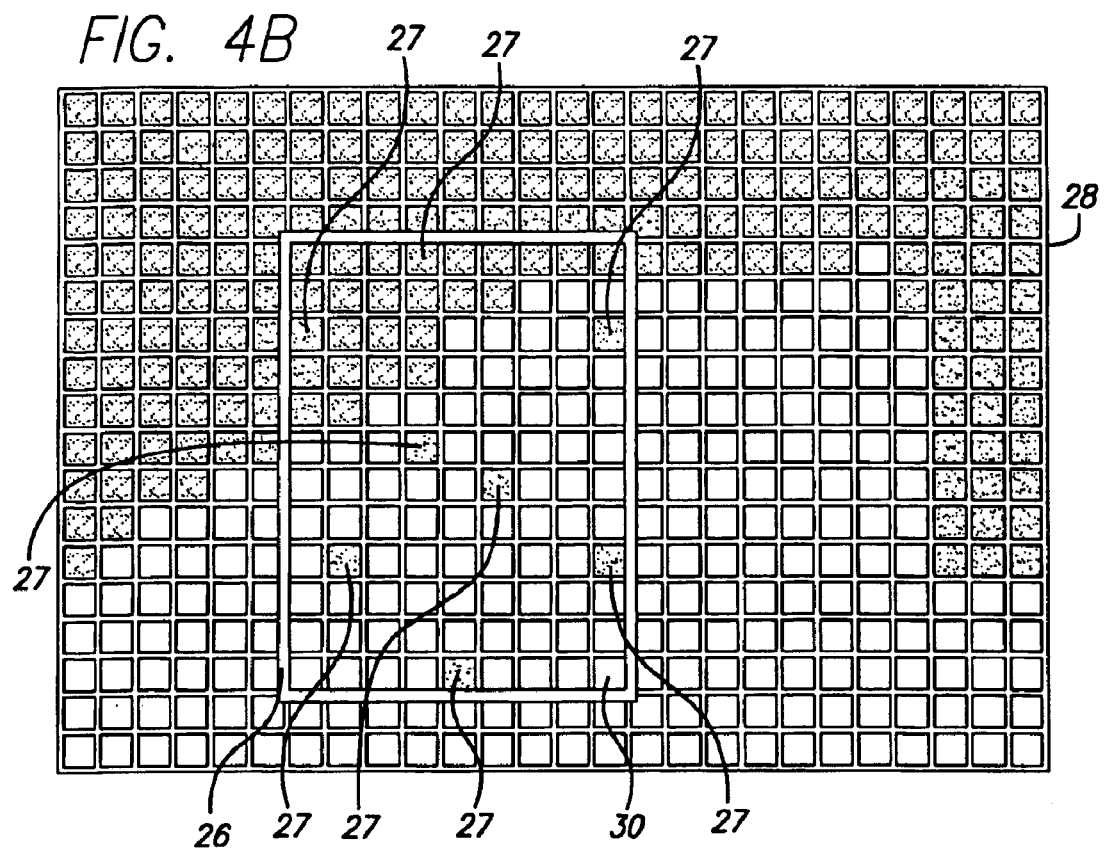
FIG. 4B is a bounding rectangle containing eight vertices of a voxel.

Referring to FIGS. 4A–4B, process 10 finds (12) a bounding rectangle 26 by projecting the eight vertices 27 of a voxel cube onto a 2D image 28 of the real-world object and recording the x coordinates and the y coordinates that correspond to the projected vertices (FIG. 4A). Process 10 generates bounding rectangle 26 so that all eight vertices lie within the bounding rectangle. Process 10 performs a comparison of image 28 and determines if any of the real-world object lies within bounding rectangle 26. Image 28 is a binary representation made up of pixels. A "1" (black) represents pixels in the real-world object and a "0" (white) represents pixels that are not in the real-world object. Image 28 is a projection transform from a 3D space (x,y,z) to a 2D point on the plane of the image (x,y).

Process 10 picks (14) two pixels at random within the bounding rectangle 26. Process 10 determines (16) if the two pixels are different pixels, meaning that one of the pixels is in the real world object and the other pixel is outside the real world object. If the two pixels are different, then process 10 labels (18) the voxel as a "maybe" voxel, meaning that the voxel is not entirely inside or outside the real world object. In other words, since there are two different pixels, the voxel cannot be labeled an "inside" voxel or an "outside" voxel.

If the two pixels are the same, process 10 picks (20) no more than n (n≧1) additional pixels. A success is finding a "maybe" voxel within n picks, meaning at least one pixel selected is different from the other pixels selected. A failure is when n pixels are picked and there is no indication that the voxel is a "maybe" voxel. To select an appropriate number of pixels, the success rate should be high enough (and the failure rate low enough) that the cost of all failures is less than the time saved by the successes. The number of pixels to select may be determined as follows. First, consider the probability, $p_d$, of finding two different values by randomly picking two pixels. Assume the probability of finding a "1" in a binary image is $p_1$. Then, the probability of finding a "0" in a binary image is $1-p_1$. Thus, the probability of making n random selections and not picking two different values is:

$$P_d = 1 - (p_1^n + (1-p_1)^n).$$

If $p_1$ is 80%, then $p_d > 90\%$ if $n > 10$. So, regardless of the size of the bounding rectangle 26, by looking at only 10 pixels, the success rate of determining a "maybe" voxel is 90%. This is more than enough to offset the cost in time of picking two random values and moving a pointer to a position in the image, as compared to rasterizing over the whole bounding rectangle 26 pixel by pixel. Finding the ideal n for all possible values of $p_1$ is more difficult, but in practice, n=20 yields approximately 85% success. Since n is the most picks chosen by process 10; if any two picks have different values, then process 10 is successful. Also, process 10 applies if the bounding rectangle 26 is larger than n pixels.

Process 10 determines (22) if any of the pixels are different by picking one pixel at a time and comparing the pixel with the other previously chosen pixels. If any of the pixels are different, process 10 labels (18) the voxel as a "maybe" voxel. If none of the voxels are different, process 10 uses (24) another technique to classify the voxel. The other techniques include rasterizing over every pixel or using an octree construction. An octree is constructed by recursively subdividing each voxel into eight subvoxels.

Figure 4C:
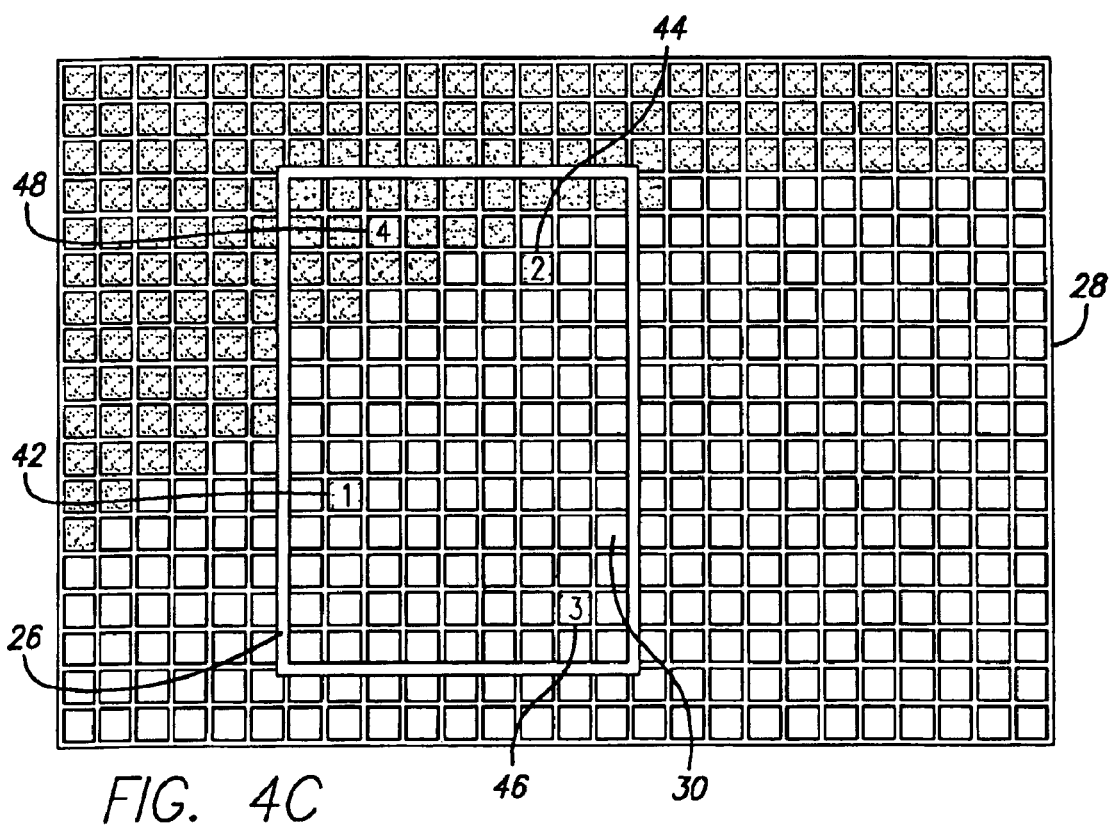
FIG. 4C is an example of the Monte Carlo method of picking random pixels within the bounding rectangle.

Referring to FIG. 4C, for example, suppose that n=20 and the first pixel 42 is compared to the second pixel 44. Since the first pixel 42 and the second pixel 44 are the same, process 10 picks a third pixel 46. Since the first pixel 42, the second pixel 44, and the third pixel 46 are the same, process 10 picks a fourth pixel 48. The fourth pixel 48 is different from the previously chosen pixels. Thus, process 10 labels (18) the voxel a "maybe" voxel. By using process 10, not all pixels within bounding rectangle 26 need to be examined in order to determine if a voxel is a "maybe" voxel. Thus, process 10 saves processing time in classifying voxels.

In other embodiments, the "maybe" voxels are further subdivided into smaller voxels using process 10 to classify these smaller voxels. By further subdividing the "maybe" voxels process 10 further defines the voxel space and results in more data (smaller voxels) near the object surface while courser voxels (large voxels) represent large uniform regions.

Figure 5:
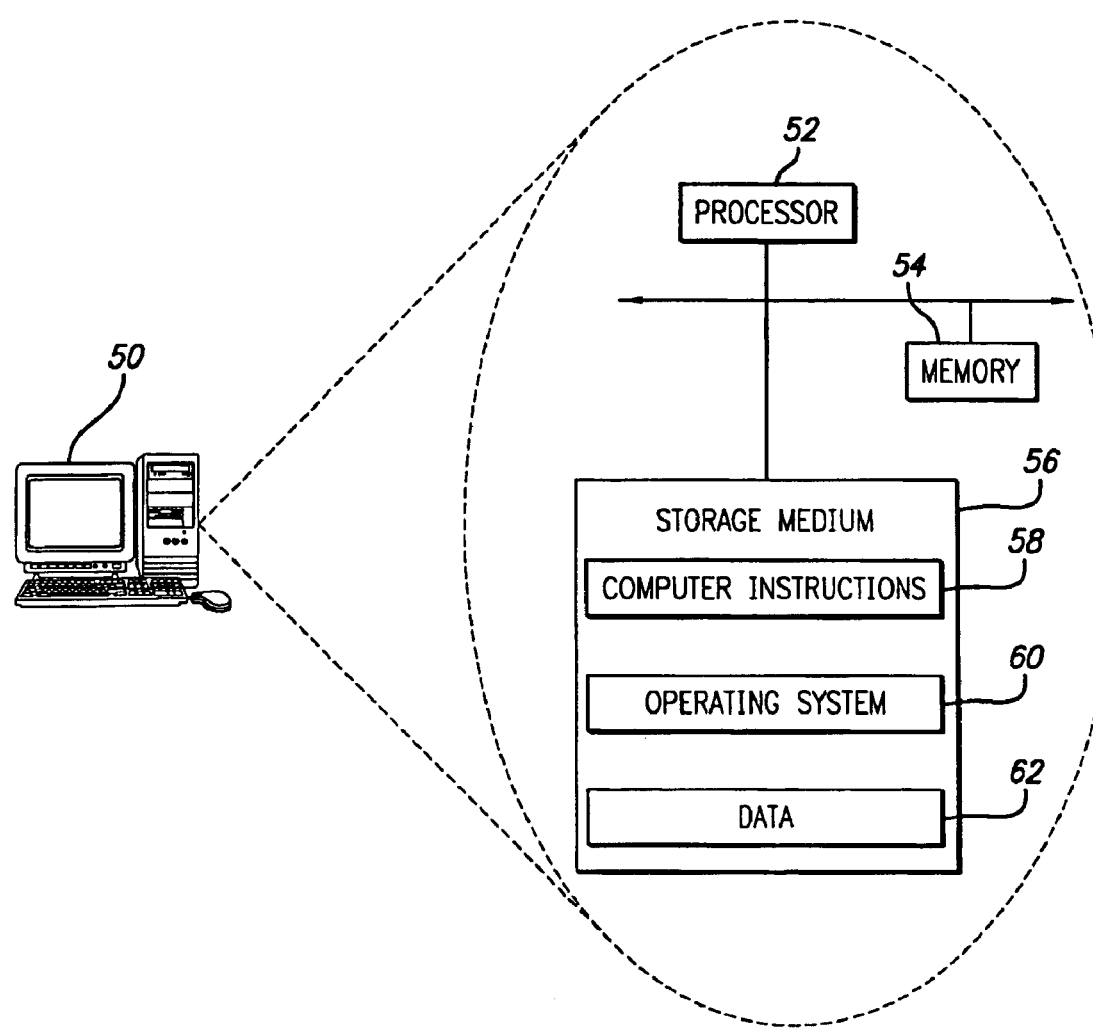
FIG. 5 is a block diagram of a computer system on which the process of FIG. 1 may be implemented.

FIG. 5 shows a computer 50 for classifying voxels using process 10. Computer 50 includes a processor 52 for processing voxels, a memory 54, and a storage medium 56 (e.g., hard disk). Storage medium 56 stores operating system 60, data 62 for storing voxels, and computer instructions 58 which are executed by processor 52 out of memory 54 to perform process 10.

Process 10 is not limited to use with the hardware and software of FIG. 5; it may find applicability in any computing or processing environment and with any type of machine that is capable of running a computer program. Process 10 may be implemented in hardware, software, or a combination of the two. Process 10 may be implemented in computer programs executed on programmable computers/machines that each includes a processor, a storage medium/article readable by the processor (including volatile and non-volatile memory and/or storage elements), at least one input device, and one or more output devices. Program code may be applied to data entered using an input device to perform process 10 and to generate output information.

Each such program may be implemented in a high level procedural or object-oriented programming language to communicate with a computer system. However, the programs can be implemented in assembly or machine language. The language may be a compiled or an interpreted language. Each computer program may be stored on a storage medium (article) or device (e.g., CD-ROM, hard disk, or magnetic diskette) that is readable by a general or special purpose programmable computer for configuring and operating the computer when the storage medium or device is read by the computer to perform process 10. Process 10 may also be implemented as a machine-readable storage medium, configured with a computer program, where upon execution, instructions in the computer program cause the computer to operate in accordance with process 10.

The process described herein is not limited to the specific embodiments set forth above. For example, the process is not limited to use on the "maybe" voxels. Process 10 can be used on the "inside" voxels and the "outside" voxels. Also, process 10 is not limited to uniformly sized voxels. Process 10 can be used with non-uniform size voxels. This may be done by performing a subdivision operation that divides a larger-sized voxel to a consistent number of child voxels that together constitute the same volume as a parent. The process is not limited to the specific processing order of FIG. 1. Rather, the blocks of FIG. 1 may be re-ordered, as necessary, to achieve the results set forth above.

Other embodiments not described herein are also within the scope of the following claims.

What is claimed is:

1. A method of classifying a voxel having vertices, comprising:

projecting the vertices of the voxel onto an image of a real-world object, the image including a set of pixels;
   generating a bounding rectangle containing the vertices;
   selecting pixels within the bounding rectangle; and
   identifying the voxel based on the pixels selected.

2. The method of claim 1, wherein selecting pixels within the bounding rectangle comprises comparing the pixels selected.

3. The method of claim 1, wherein selecting pixels within the bounding rectangle comprises picking a first pixel and a second pixel.

4. The method of claim 3, wherein identifying the voxel comprises labeling the voxel as an undetermined voxel if the first pixel and the second pixel are different type pixels.

5. The method of claim 4, wherein selecting pixels within the bounding rectangle comprises picking up to n ($n \geq 1$) additional pixels until a dissimilar pixel is found if the first pixel and the second pixel are the same type pixel.

6. The method of claim 5, wherein generating the bounding rectangle comprises recording x coordinates and y coordinates of the vertices.

7. The method of claim 5, further comprising rastering over each pixel in the bounding rectangle if n pixels are the same type pixel.

8. The method of claim 5, further comprising performing an octree construction for each pixel in the bounding rectangle if n pixels are the same type pixel.

9. The method of claim 5, further comprising:

subdividing the undetermined voxel into a set of smaller voxels;
   projecting the vertices of the smaller voxel onto the image;
   generating a smaller bounding rectangle containing the vertices of the smaller voxel; and
   identifying the smaller voxel by selecting pixels within the smaller bounding rectangle.

10. The method of claim 5, wherein picking up to n additional pixels comprises picking up to twenty pixels.

11. An apparatus comprising:

a memory that stores executable instructions for classifying a voxel having vertices; and
    a processor that executes the instructions to:
    project the vertices of the voxel onto an image of a real-world object, the image including a set of pixels;
    generate a bounding rectangle containing the vertices;
    select pixels within the bounding rectangle; and
    identify the voxel based on the pixels selected.

12. The apparatus of claim 11, wherein instructions to select pixels within the bounding rectangle comprise instructions to compare the pixels selected.

13. The apparatus of claim 11, wherein instructions to select pixels within the bounding rectangle comprise instructions to pick a first pixel and a second pixel.

14. The apparatus of claim 13, further comprising instructions to label the voxel as an undetermined voxel when the first pixel and the second pixel are different type pixels.

15. The apparatus of claim 14, wherein instructions to select pixels within the bounding rectangle comprise instructions to pick up to n ($n \geq 1$) additional pixels until a dissimilar pixel is found if the first pixel and the second pixel are the same type pixel.

16. The apparatus of claim 15, wherein instructions to generate the bounding rectangle comprise instructions to record x coordinates and y coordinates of the vertices.

17. The apparatus of claim 15, further comprising instructions to raster over each pixel in the bounding rectangle if n pixels are the same type pixel.

18. The apparatus of claim 15, further comprising instructions to perform an octree construction for each pixel in the bounding rectangle if n pixels are the same type pixel.

19. The apparatus of claim 15, wherein instructions to pick up to n additional pixels comprises instructions to pick up to twenty pixels.

20. The apparatus of claim 14, further comprising instructions to:
    subdivide the undetermined voxel into a set of smaller voxels;
    project the vertices of the smaller voxel onto the image;
    generate a smaller bounding rectangle containing the vertices of the smaller voxel; and
    identify the smaller voxel by selecting pixels within the smaller bounding rectangle.

21. An article comprising a machine-readable medium that stores executable instructions for classifying a voxel having vertices, the instructions causing a machine to:
    project the vertices of the voxel onto an image of a real-world object, the image including a set of pixels;
    generate a bounding rectangle containing the vertices;
    select pixels within the bounding rectangle; and
    identify the voxel based on the pixels selected.

22. The article of claim 21, wherein instructions causing a machine to select pixels within the bounding rectangle comprise instructions causing a machine to compare the pixels selected.

23. The article of claim 21, wherein instructions causing a machine to select pixels within the bounding rectangle comprise instructions causing a machine to pick a first pixel and a second pixel.

24. The article of claim 23, wherein instructions causing a machine to determine the voxel type comprises instructions causing a machine to label the voxel as an undetermined voxel when the first pixel and the second pixel are different type pixels.

25. The article of claim 24, wherein instructions causing a machine to select pixels within the bounding rectangle comprise instructions causing a machine to pick up to n ($n \geq 1$) additional pixels until a dissimilar pixel is found if the first pixel and the second pixel are the same type pixel.

26. The article of claim 25, wherein instructions causing a machine to generate the bounding rectangle comprise instructions causing a machine to record x coordinates and y coordinates of the vertices.

27. The article of claim 26, further comprising instructions causing a machine to:
    subdivide the undetermined voxel into a set of smaller voxels;
    project the vertices of the smaller voxel onto the image;
    generate a smaller bounding rectangle containing the vertices of the smaller voxel; and
    identify the smaller voxel by selecting pixels within the smaller bounding rectangle.

28. The article of claim 25, further comprising instructions causing a if n pixels are the same type pixel.

29. The article of claim 25, further comprising instructions causing a machine to perform an octree construction for each pixel in the bounding rectangle when n pixels are the same type pixel.

30. The article of claim 25, wherein instructions causing a machine to pick up to n additional pixels comprise instructions causing a machine to pick up to twenty pixels.

* * * * *